United States Patent
Ramakrishnan et al.

(10) Patent No.: US 10,289,353 B2
(45) Date of Patent: May 14, 2019

(54) TRANSFER JOBS TO SERVICE PRINTERS

(71) Applicant: HEWLETT-PACKARD DEVELOPMENT COMPANY, L.P., Houston, TX (US)

(72) Inventors: Senthil Kumar Ramakrishnan, Boise, ID (US); Nataraj Kumar Gobbak, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/748,237

(22) PCT Filed: Jan. 29, 2016

(86) PCT No.: PCT/US2016/015804
§ 371 (c)(1),
(2) Date: Jan. 29, 2018

(87) PCT Pub. No.: WO2017/131778
PCT Pub. Date: Aug. 3, 2017

(65) Prior Publication Data
US 2018/0203649 A1  Jul. 19, 2018

(51) Int. Cl.
G06F 3/12 (2006.01)
H04N 1/32 (2006.01)
H04N 1/00 (2006.01)

(52) U.S. Cl.
CPC ............ *G06F 3/1207* (2013.01); *G06F 3/122* (2013.01); *G06F 3/1265* (2013.01); *G06F 3/1267* (2013.01); *G06F 3/1274* (2013.01); *G06F 3/1288* (2013.01); *G06F 3/1291* (2013.01); *H04N 1/00* (2013.01); *H04N 1/32545* (2013.01)

(58) Field of Classification Search
USPC ........................................................ 358/1.13
See application file for complete search history.

(56) References Cited

U.S. PATENT DOCUMENTS

| | | | |
|---|---|---|---|
| 7,333,245 | B2 | 2/2008 | Peter et al. |
| 7,362,457 | B1 | 4/2008 | Shima |
| 7,804,611 | B2 | 9/2010 | Castellani |
| 2003/0093525 | A1* | 5/2003 | Yeung .............. H04L 29/06 709/225 |
| 2004/0100653 | A1 | 5/2004 | Azami |

(Continued)

FOREIGN PATENT DOCUMENTS

WO  WO-2012-087413 A1  6/2012
WO  WO-2014-155385 A1  10/2014

OTHER PUBLICATIONS

Maraz et al. . Remote Print File Transfer and Spooling Application for Use With a One-Way Data-Link; Jun. 28, 2012, WIPO, WO 2012/0087413 Listed on IDS, All Pages.*

(Continued)

*Primary Examiner* — Ngon B Nguyen
(74) *Attorney, Agent, or Firm* — HPI Patent Department

(57) ABSTRACT

An example print system is described as including a manager engine that identifies an attribute of a job, a discovery engine that identifies a service printer available to store the job, a transfer engine that causes the job to transfer from a first printer to a second printer, and a remote job engine that maintains job retrieval information associated with the job.

15 Claims, 7 Drawing Sheets

(56) References Cited

U.S. PATENT DOCUMENTS

| | | |
|---|---|---|
| 2004/0136030 A1 | 7/2004 | Gassho |
| 2004/0184074 A2 | 9/2004 | Leiman et al. |
| 2006/0050294 A1 | 3/2006 | Smith et al. |
| 2008/0007780 A1* | 1/2008 | Ihara .................... G06F 21/608 |
| | | 358/1.16 |
| 2008/0259929 A1 | 10/2008 | Mraz |
| 2009/0094198 A1 | 4/2009 | Monga et al. |
| 2013/0033727 A1* | 2/2013 | Suzuki ................. G06F 3/1205 |
| | | 358/1.15 |
| 2014/0049797 A1 | 2/2014 | Huster |

OTHER PUBLICATIONS

Maraz et al. . Remote Print File Transfer and Spooling Application for Use With a One-Way Data-Link; Jun. 28, 2012, WIPO, WO 2012/0087413 Listed on IDS, All Pages (Year: 2012).*

Jetmobile S.A.S., "SecureJet Enterprise Secure Printing," (web page), available Jul. 29, 2015, <https://www.jetmobile.com/securejet-enterprise-secure-printing>.

ZIH Corp., "ZERBRA ZXP Series 3 User's Manual," 134 p.

* cited by examiner

TRANSFER JOBS TO SERVICE PRINTERS

CROSS-REFERENCE TO RELATED APPLICATION

The present application is the U.S. National Stage under 35 U.S.C. § 371 of International Patent Application No. PCT/US2016/015804, filed 29 Jan. 2016, the disclosure of which is hereby incorporated herein by reference.

BACKGROUND

An office may include computers and peripheral devices, such as imaging devices, to complete administrative tasks, for example. An imaging device may be able to perform an imaging operation based on a job. For example, an imaging device may receive a print job to print a presentation received from a compute device or a user may select to copy a document using a scanner coupled to the imaging device.

DETAILED DESCRIPTION

In the following description and figures, some example implementations of apparatus, print systems, and/or processes for storing a job on a service printer are described. An imaging apparatus may be a printer that is capable of performing printing operations. In examples described herein, a "print device" may be a device to print content on a physical medium (e.g., paper or a layer of powder-based build material, etc.) with a print fluid (e.g., ink or toner). A print device may utilize suitable printing consumables, such as ink, toner, fluids or powders, or other raw materials for printing. In the case of printing on a layer of powder-based build material, the print device may utilize the deposition of print fluids in a layer-wise additive manufacturing process. For example, a printing device may be a three-dimensional (3D) printing device and a print fluid may be a powder-based build material, a fusing agent, a coloring agent, and the like. A print device may be a multifunctional device (MFD) that provides more than one functionality, such as printing, copying, scanning, emailing, finishing, etc. Multiple peripheral devices may be located on a network and may provide varies functionalities and combinations of functionalities where some devices may not have the same capabilities as others.

Various examples described below relate to implementing storage capabilities for a target printer (which may, for example, have limited job storage capability) to remotely store the job with another printer of the network (i.e., a service printer as discussed herein). By utilizing a network protocol to identify printer capabilities and tag jobs with identifiers associated with the job, the data of the job may be stored on any available printer within the network and, as an example, the storage devices of any printer may act a shared network resource.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the term "maintain" (and variations thereof) as used herein means "to create, delete, add, remove, access, update, and/or modify."

Figure 1:
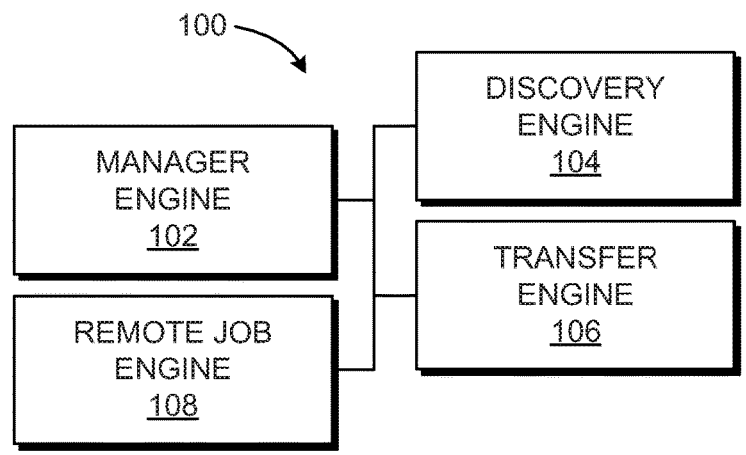
FIGS. 1 and 2 are block diagrams depicting example print systems.
Figure 2:
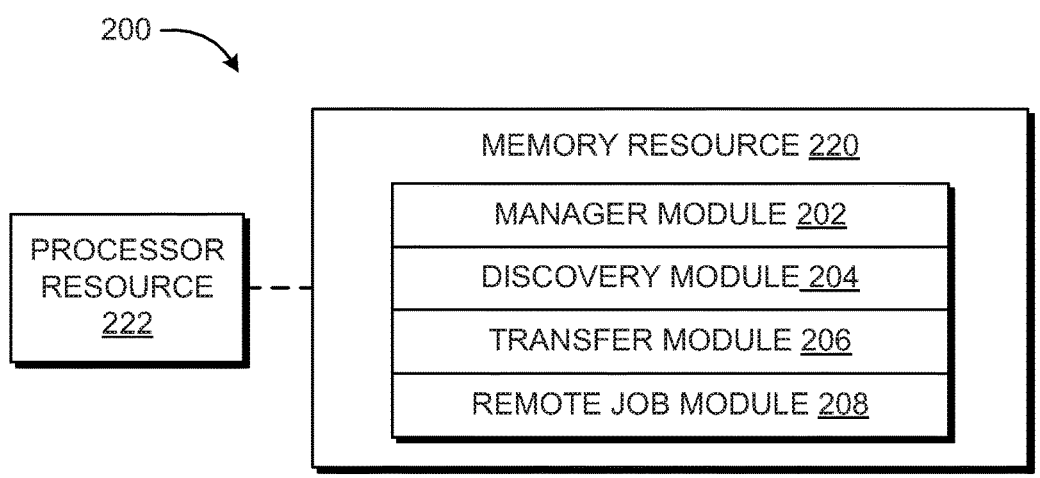

FIGS. 1 and 2 are block diagrams depicting example print systems 100 and 200. Referring to FIG. 1, the example print system 100 of FIG. 1 generally includes a manager engine 102, a discovery engine 104, a transfer engine 106, and a remote job engine 108. In general, the manager engine 102 manages the request to identify a storage location via the discovery engine 104 and stores the job at an identified service printer via the transfer engine 106 and the job retrieval information is maintained by the remote job engine 108 to later retrieve the job from the service printer.

The manager engine 102 represents any circuitry or combination of circuitry and executable instructions to identify an attribute of a job. As used herein, a job is a unit of work to be run on a printer and can consist of printing one or more files. The system assigns a unique job number to each job as it is received. The job may be defined by a job file. For example, a print job may be contained in a print job file having a first set of data representative of the settings or other configuration options associated with printing the job and a second set of data representative of the content of the print job, such as the data representing a color image to print on a sheet of media. For another example, a job may be a fax job that is received at a particular time and routed to another printer based on the time of day received. An attribute of a job, as used herein, refers to a characteristic of the job, such as the type of job, a print option, a size of the job, a creation time of the job, a security parameter of the job, the location of the source of the job, a network group of the target printer, and the like. The manager engine 102 may identify multiple attributes associated with a job and determine a combination of the attributes to provide to the discovery engine 104 when selecting a service printer for remote storage of the job.

The discovery engine 104 represents any circuitry or combination of circuitry and executable instructions to identify a service printer available to store the job based on the attribute. For example, the discovery engine 104 may be a combination of circuitry and executable instructions that when executed by the circuitry cause a target printer to broadcast a service request to a network of printers, identifies a plurality of printers that reply to the service request, send a service attribute request to a service printer of the plurality of printers that replied to the service request, and select a particular service printer of the plurality of printers based on the capability of the service printer. The discovery engine 104 may compare the job attribute to the service attribute of the service printer. For example, the discovery engine 104 may compare the location of the target printer to the location of the service printer and compare the size of the print job to the storage disk size of the service printer and/or the storage status of the service printer. As used herein, the storage status of the printer represents the state of the printer with regards to the storage capabilities of the printer. For example, a storage status of the printer may be "busy" when there is no available capacity to store a print job, "available" when there is available disk space to store the job on the service printer, or "off" when the service printer is not in an operational state.

The transfer engine 106 represents any circuitry or combination of circuitry and executable instructions to cause a job to transfer from a target printer to a service printer. The job may originate from the target printer or originate from a compute device that sent the job to the target printer. The target printer may temporarily store the job on a memory resource of the target printer until the job is transferred to a service printer. Upon successful transfer of the job to a remote service printer, the target printer may remove the job from a local memory resource. The transfer engine 106 may retrieve the job from the service printer using job retrieval information stored on the target printer.

The remote job engine 106 represents any circuitry or combination of circuitry and executable instructions to maintain job retrieval information associated with the job. As used herein, job retrieval information represents data used to retrieve the job from a service printer. For example, the job retrieval information may contain a service printer identifier associated with the service printer (such as an internet protocol address or other connection parameter), user information associated with the user who generated the job, a target printer identifier associated with the target printer, a location identifier associated with the location of the job in device storage on the service printer, a hash identifier that represents a combination of identification information, such as a unique identifier resulting from performing a hash operation on the service printer identifier and storage location identifier, and the like. The remote job engine 108 may receive an identifier from the service printer and/or generate an identifier from the information received from the service printer. For example, the remote job engine 108 may store an identifier from the service printer with user information identifying the source of the job.

The target printer may refer to the job retrieval information when completing jobs in the print queue. The target printer may utilize a single identifier of the job retrieval information or multiple identifiers from the job retrieval information to retrieve the job from the service printer. For example, the target printer, via the remote job engine and transfer engine, may identify a remote job located in the print queue based on a unique identifier associated with the job, may use a service printer identifier to identify a connection parameter of a connection method with the service printer, and may use the job identifier to identify a storage location of the job when making the request to the service printer to retrieve the job.

Figure 3A:
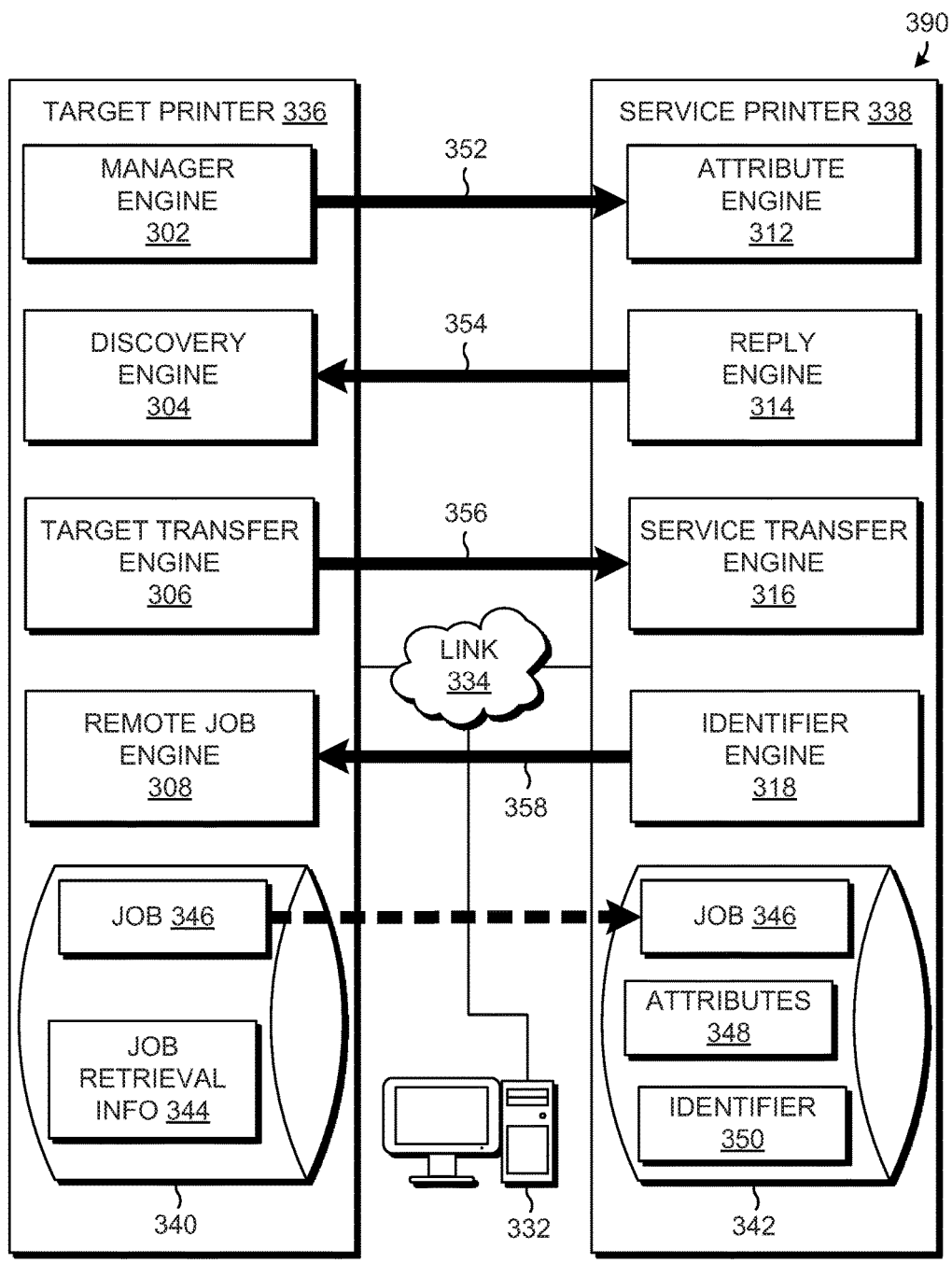
FIGS. 3A and 3B depicts an example environment in which various print systems may be implemented.
Figure 3B:
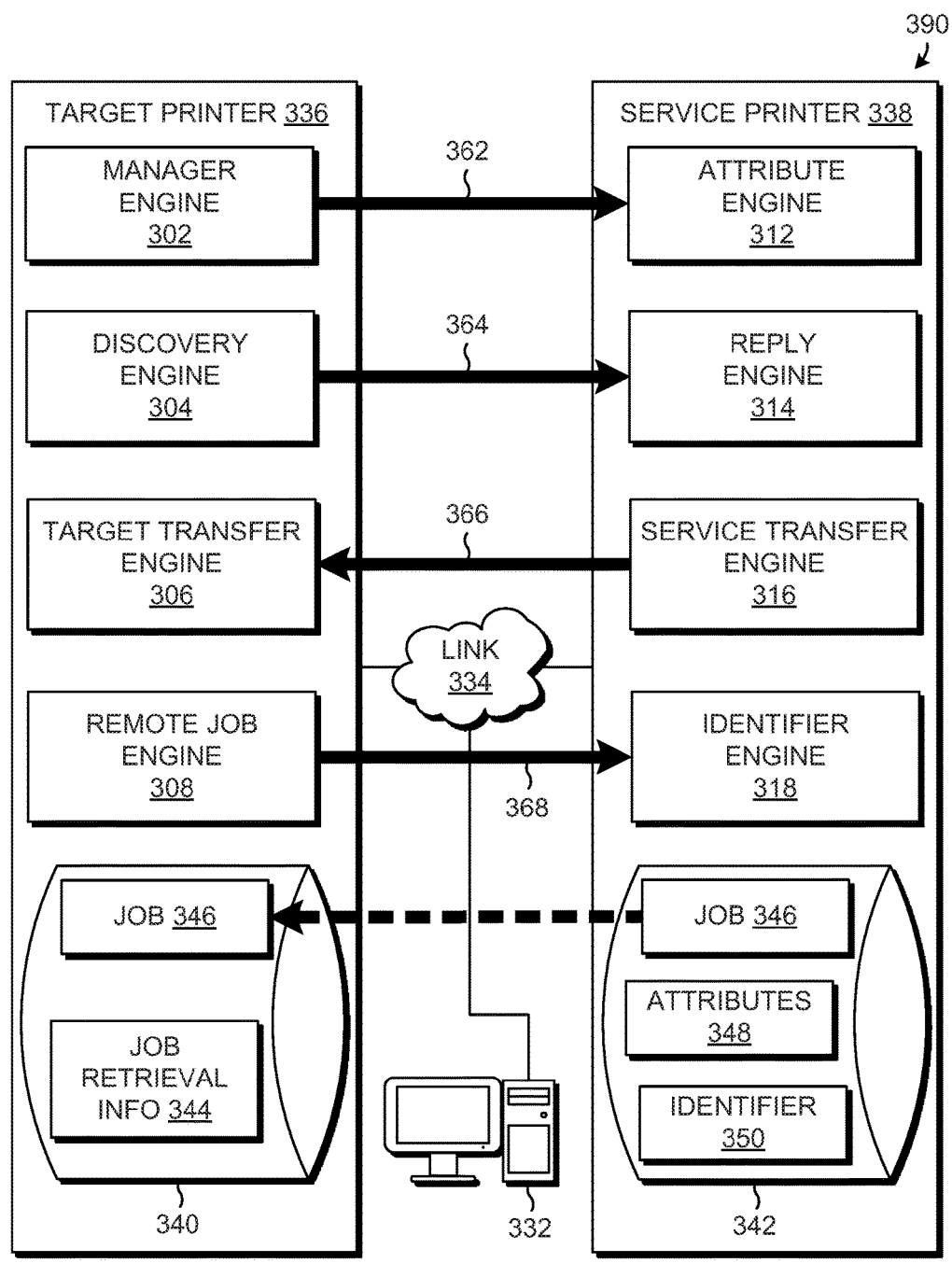
Figure 4:
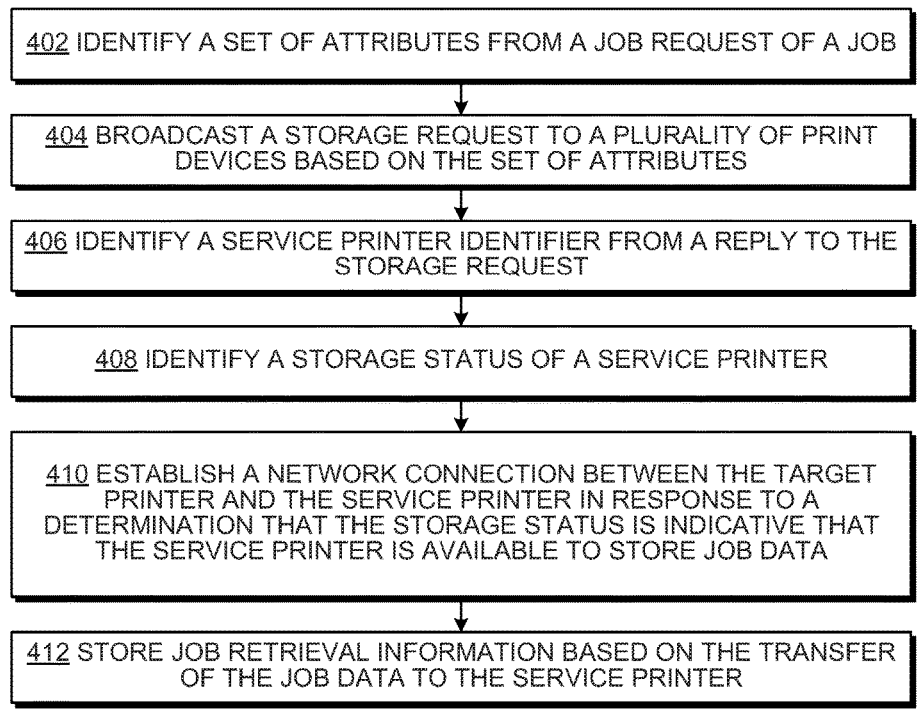
FIGS. 4 and 5 are flow diagrams depicting example processes of operation of a target printer.
Figure 5:
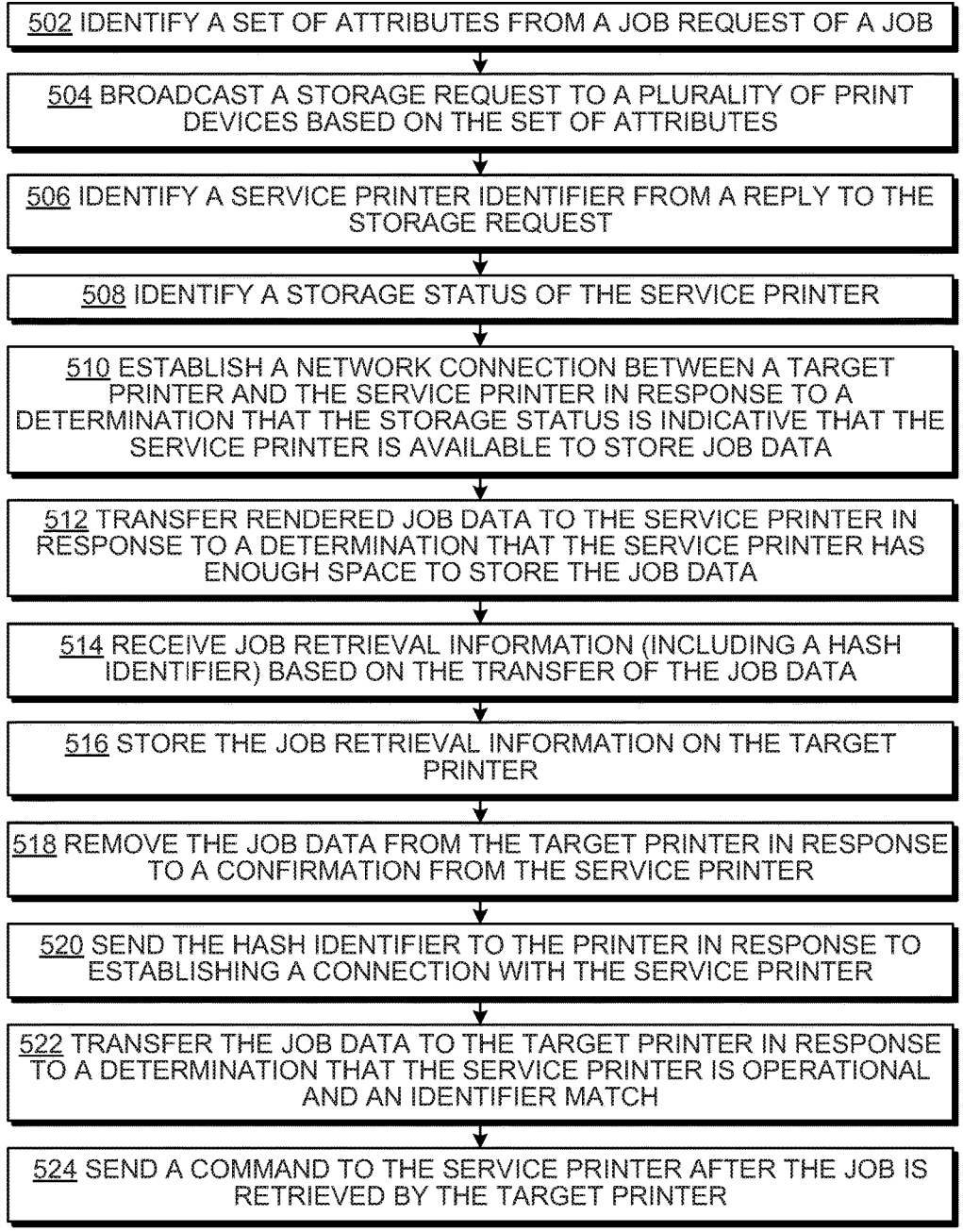
Figure 6:
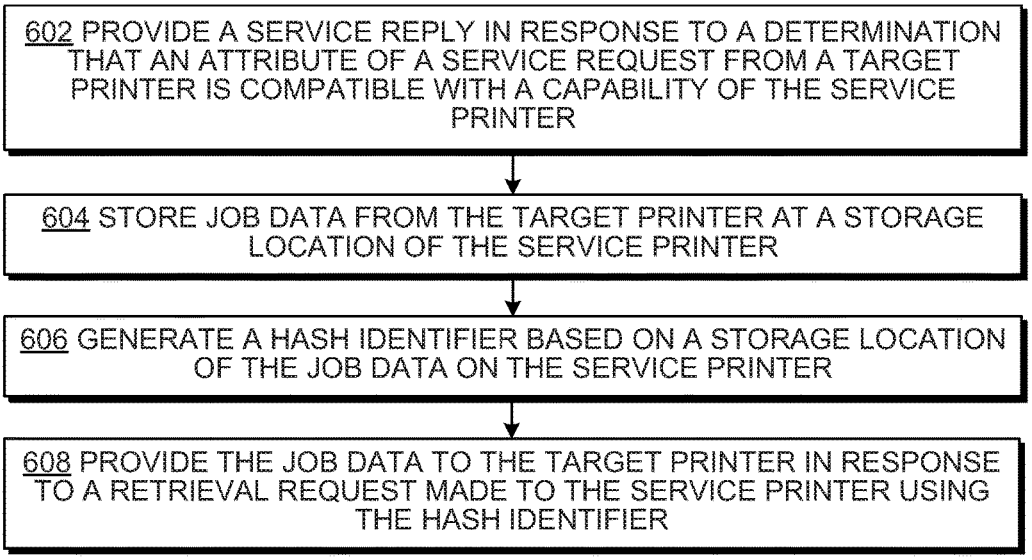
FIGS. 6-8 are flow diagrams depicting example processes of operation of a service printer.

In some examples, functionalities described herein in relation to any of FIGS. 1-3 may be provided in combination with functionalities described herein in relation to any of FIGS. 4-6.

FIG. 2 depicts the example system 200 may comprise a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as a manager module 202, a discovery module 204, a transfer module 206, and a remote job module 208. The manager module 202, the discovery module 204, the transfer module 206, and the remote job module 208 represent program instructions that when executed function as the manager engine 102, the discovery engine 104, the transfer engine 106, and the remote job engine 108 of FIG. 1, respectively. The processor resource 222 may carry out a set of instructions to execute the modules 202, 204, 206, 208 and/or any other appropriate operations among and/or associated with the modules of the system 200. For example, the processor resource 222 may carry out a set of instructions to identify a set of attributes from a job request of a job, broadcast a storage request to a plurality of print devices based on the set of attributes, identify a service printer identifier from a reply to the storage request, identify a storage status of a service printer of the plurality of print devices, establish a network connection between the target printer and the service printer to transfer the job to the service printer using the service printer identifier in response to a determination that the storage status is indicative that the service printer is available to store the job data of the job, and receive job retrieval information based on the transfer of the job data to the service printer. For another example, the processor resource 222 may carry out a set of instructions to perform the operations described with respect to FIGS. 3A and/or 3B. For yet another example, the processor resource 222 may carry out a set of instruction to cause a target printer to perform the operations described with relation to FIGS. 4 and/or 5. For yet another example, the processor resource may carry out a set of instruction to cause a service printer to perform the operations described with respect to FIGS. 6, 7, and/or 8.

Although these particular modules are illustrated and discussed in relation to FIG. 2 and other example implementations, other combinations or sub-combinations of modules may be included within other implementations and the specific functionalities and other functionalities discussed in the examples herein may be accomplished, implemented, or realized at different modules or at combinations of modules.

As used herein, a processor resource represents any appropriate circuitry capable of processing (e.g., computing) instructions, such as one or multiple processing elements capable of retrieving instructions from a memory resource and executing those instructions. For example, the processor resource 222 may be a central processing unit (CPU) that enables remote job storage by fetching, decoding, and executing modules 202, 204, 206, and 208. Examples of a processor resource include a CPU, a semiconductor-based microprocessor, a programmable logic device (PLD), and the like. Example of a PLD include an application-specific integrated circuit (ASIC), a field-programmable gate array (FPGA), a programmable array logic (PAL), a complex programmable logic device (CPLD), an erasable programmable logic device (EPLD), and the like. A processor resource may include multiple processing elements that are integrated in a single device or distributed across devices. A processor resource may process instructions serially, concurrently, or in partial concurrence.

As used herein, a memory resource represents a non-transitory medium (or combination of non-transitory media) capable of containing (i.e., storing) data (such as modules of the system 200) in a machine-readable format (e.g., a computer-readable medium). Such a medium may be an electronic, magnetic, optical, or other physical storage device that is a storage medium, which is distinct from a transitory transmission medium, such as a signal. The memory resource 220 may be a non-volatile memory resource such as read-only memory (ROM), a volatile memory resource such as random access memory (RAM), another storage device, or a combination thereof. Example forms of a memory resource 220 include a hard drive (HD), a solid state drive (SSD), an optical drive, a static RAM (SRAM) module, a dynamic RAM (DRAM) module, electrically erasable programmable ROM (EEPROM), flash memory, and the like.

In the discussion herein, the engines 102, 104, 106 and 108 of FIG. 1 and the modules 202, 204, 206 and 208 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as the processor resource 222, for executing those instructions. The memory resource 220 may be integrated in the same device as the processor resource 222 or it may be separate but accessible to that device and the processor resource 222.

The instructions residing on the memory resource 220 may comprise any set of instructions to be executed directly (such as machine code) or indirectly (such as a script) by the processor resource 222. In some examples, the system 200 may include executable instructions as part of an installation package that when installed may be executed by the processor resource 222 to implement functionality of the system 200, such as methods described with regards to FIGS. 4-8. In that example, the memory resource 220 may be a portable medium such as a compact disc, a digital video disc, a flash drive, or memory maintained by a computer device, such as a server, from which the installation package may be downloaded and installed. In another example, the executable instructions may be part of an application or applications already installed.

FIGS. 3A and 3B depict example environments 390 in which various example systems for transferring a job to a service printer and from a service printer may be implemented. The example environment 390 is shown to include example systems implemented on a target printer 336 and a service printer 338 that represent generally any circuitry or combination of circuitry and executable instructions to facilitate remote job storage on the service printer 338. The system may include a manager engine 302, a discovery engine 304, a target transfer engine 306, and a remote job engine 308 that are similar to the manager engine 102, the discovery engine 104, the transfer engine 106, and the remote job engine 108 of FIG. 1, respectively. The service printer 338 may include a counterpart system to interact with the target printer for remote job storage, which may include an attribute engine 312, a reply engine 314, a service transfer engine 316, and an identifier engine 318. As shown in FIGS. 3A and 3B, the engines 302, 304, 306, and 308 may be integrated into a compute device, such as a target printer 336, and the engines 312, 314, 316, and 318 may be integrated into a compute device, such as service printer 338. The engines 302-318 may be integrated via circuitry or as installed instructions into a memory resource of the compute device.

The example environment 390 may include compute devices, such as a client devices 332 and printers 336 and 338. For example, a print job may be generated from client device 332 and sent to target printer 336 that uses the print system to identify a storage location of the print job on the service printer 338.

As depicted in the environment 390 of FIG. 3A, a user may send a storable job to any printer in the network as long as at least one printer in the network has non-volatile (e.g., long-term, permanent, etc.) storage, such as an HDD or SSD, that is made available for sharing with the other network printers, such as target printer 336. When a user desires to send a stored job, the user may send the job to the target printer 336 (which may not have long-term storage capabilities) where the job is temporarily stored, such as in local volatile RAM of the target printer 336. The target printer 336 uses the manager engine 302 to perform the discovery process (represented in FIG. 3A by arrow 352). For example, the manager engine 302 may use a service location protocol (SLP) to discover the storage service offered by any nearby printers on the network, such as service printer 338. The service printer 338 may receive the discover request and identify the service capabilities of the service printer using the attribute engine 312. The service printer 338 may identify that it offers the service (as identified by the attribute engine 312) and the reply engine 314 replies (represented in FIG. 3A by arrow 354) to the service request with a service reply, such as a unicast to the requester, with a service identifier, such as a uniform resource locator (URL) of the service. Once the target printer 336 finds the service printer 338 with service URL, the target printer 336 may make a TCP connection to the service printer 338 as advertised in the service reply (e.g., using the proper port number) then sends an attribute request, where, in response, the service printer 338 responds with set of attributes 348, such as a hostname, a port number on which the job can be retrieved later, the amount of space available in the service printer 338 for shared job storage, and/or the like. The target printer 336 may determine the amount of space required to store the job and the space requirement of the service printer 338 is compared by the discovery engine 304 and the target transfer engine 306 sends (represented in FIG. 3A by arrow 356) the stored job 346 from internal memory (e.g., data store 340) to the service printer 338 as received by the service transfer engine 316.

The service printer 338 receives the job and stores the job in the local storage resource (e.g., data store 342). The identifier engine 318 generates an identifier 350 representative of the job and sends (represented in FIG. 3A by arrow 358) the identifier to the target printer 336 to maintain with the job retrieval information 344. For example, the identifier engine 318 may calculate a unique 128 bit hash identifier using an industry standard hashing process and sends the unique hash identifier back to the target printer 336. As an example to facilitate shared disk space management, the transmission control protocol (TCP) session may remain in a connected state until the service printer 338 sends the hash identifier to the target printer 336 wherein the service printer may allow only one session at a time. These transactions may be encrypted, such as by using a secured TCP connection. The target printer 336, after receiving the identifier 350 from the service printer 338, stores the identifier 350 in the data store 340 as part of the job retrieval information (e.g., with additional information like the username of the user who sent the job and the hostname/port for retrieving this job from the service printer).

FIG. 3B depicts a process for retrieval of the remotely stored job 346. The target printer 336 may start a stored job print session (represented in FIG. 3B by arrow 362) using the job retrieval information 344. For example, the job retrieval information is stored in data store 340 (e.g., non-volatile memory in the target printer 336) which enables the target printer 336 to display the stored job information to the user. The target printer 336 may not disclose to the user that the job is remotely stored; for example, the target printer 336 may display the user name and job identifier in a fashion similar to locally stored jobs. The target printer uses the job retrieval information 344 (e.g., a service printer identifier such as a hostname, port number, and/or other connection parameters) to make a TCP connection to the service printer 338 and sends (represented in FIG. 3B by arrow 364) the identifier 350 corresponding to the job the user has selected. The service printer 338, which may be running a server at the specified port, queries an internal database to find the job corresponding to the hash identifier 350, reads the job from the data store 342 (e.g., the local disk storage of the service printer) and sends (represented in FIG. 3B by arrow 336) the job to target printer 336 to be completed by the target printer 336.

The target printer 336 may use the remote job engine 308 to send (represented in FIG. 3B by arrow 368) a command to the service printer 338 to manage the remote storage on the service printer 338. For example, the target printer 336, after printing the retrieved job, may respond with a unique command, such as an American Standard Code for Information Interchange (ASCII) word or a predefined number assigned with a specific meaning. For example, if the target printer 336 provides the service printer 338 with a "delete" keyword the service printer 338 deletes the stored job from the storage disk or, if the target printer 336 sends a "store" keyword, the service printer 338 may continue to store the job, such as when the job may be printed again at a later time. A reply, message, or other communication discussed herein may be communicated by any appropriate network protocol, such as a packet-based messaging protocol. The remote storage of the job may be unknown to a user and the target printer may automatically manage whether to store the job locally or remotely at a service printer.

The compute devices may be located on the same network or separate networks. The example environment 390 may include any appropriate number of networks and any number of the networks may include a cloud compute environment that includes a virtual shared pool of compute resources. For example, the engines and/or modules of the system herein may reside and/or execute "on the cloud" (e.g., reside and/or execute on a virtual shared pool of resources).

A link 334 generally represents one or a combination of a cable, wireless connection, fiber optic connection, or remote connections via a telecommunications link, an infrared link, a radio frequency link, or any other connectors of systems that provide electronic communication. The link 334 may include, at least in part, intranet, the Internet, or a combination of both. The link 334 may also include intermediate proxies, routers, switches, load balancers, and the like.

The data stores 340 and 342 may contain information utilized by the engines 302, 304, 306, 308, 312, 314, 316, and 318. For example, the data store 340 of the target printer 336 may store job retrieval information 344 (as well as temporarily store the job 346), and the data store 342 of the service printer 338 may store the job 346, a set of service attributes 348, and an identifier 350, such as a service printer identifier or a job identifier.

Referring to FIGS. 1-3, the engines 102, 104, 106, and 108 of FIG. 1 and/or the modules 202, 204, 206, and 208 of FIG. 2 may be distributed across devices 332, 336, 338, or a combination thereof. The engine and/or modules may complete or assist completion of operations performed in describing another engine and/or module. For example, the target transfer engine 306 of FIG. 3A may request, complete, or perform the methods or operations described with the transfer engine 106 of FIG. 1 as well as the manager engine 102, the discovery engine 104, and the remote job engine 108 of FIG. 1. Thus, although the various engines and modules are shown as separate engines in FIGS. 1 and 2, in other implementations, the functionality of multiple engines and/or modules may be implemented as a single engine and/or module or divided into a variety of engines and/or modules. In some example, the engines of the system may perform example methods described in connection with FIGS. 4-8.

FIGS. 4 and 5 are flow diagrams depicting example processes of operation of a target printer. Referring to FIG. 4, processes of operation of a target printer may generally comprise identifying job attributes, broadcasting a storage request, identifying a storage status of a service printer from the replies, establishing a connection with an available service printer, and storing job retrieval information. The operations of the target printer may be defined by executable instructions stored on a computer-readable storage medium of the target printer that cause operations described herein with respect to FIGS. 4 and 5 when the instructions are executed. The process of operation of a target printer may be performable by the engines 302, 304, 306, and 308 of the target printer 336 of FIGS. 3A and 3B, for example.

At block 402, a set of attributes are identified from a job request of a job. For example, the job request may be mapped to a set of parameters or parsed to identify parameters of the job request that are associated with job attributes, such as print options, job size, duplex, source location, username, etc. The attributes may be identified by a manager engine, such as manager engine 102 of FIG. 1.

At block 404, a storage request is broadcasted to a plurality of print devices based on the set of attributes. For example, a discovery engine, such as discovery engine 104 of FIG. 1, may send a broadcast message (e.g., a multicast message) to a number of printers in the local area network with a set of parameters in the message associated with the identified attributes of the job.

At block 406, a service printer identifier is identified from a reply to the storage request. For example, a discovery engine, such as discovery engine 104 of FIG. 1, may receive a plurality of responses from printers on the network and may compare the responses to the identified attributes of the job in order to determine which printer of plurality of replies received should be further contacted to store the job.

At block 408, a storage status of a service printer is identified. For example, a discovery engine, such as discovery engine 104 of FIG. 1, may send a status request to a service printer associated with the service printer identifier identified at block 406 to return a status request. For another example, the discovery engine may compare the replies to the storage request to identify the storage status of the plurality of printers. The storage status is used by the discovery engine, for example, to verify that the service printer is available to store the job.

At block 410, a network connection is established between the target printer and the service printer associated with the service printer identifier. For example, a transfer engine, such as transfer engine 106 of FIG. 1, may establish a network connection with a service printer via a transmission control protocol (TCP) in response to a determination that the storage status identified at block 408 is indicative that the service printer is available to store job data of the job.

The target printer may receive a confirmation that the job was stored on the service printer and the target printer may store job retrieval information based on the transfer of the job data to the service printer at block 412. For example, a remote job engine, such as remote job engine 108 of FIG. 1, may receive job retrieval information generated by the service printer based on the transfer of the job data and store the job retrieval information on a local memory resource. For another example, a remote job engine may generate the job retrieval information based on the transfer of the job data to the service printer and store the generated job retrieval information on a local memory resource for later retrieval of the job.

FIG. 5 includes blocks similar to blocks of FIG. 4 and provides additional blocks and details. In particular, FIG. 5 depicts additional blocks and details generally regarding transferring the print job, receiving job retrieval information, remove job data from the target printer, and later retrieving the job from the service printer. Blocks 502, 504, 506, 508, 510, and 516 are the similar to blocks 402, 404, 406, 408, 410, and 412 of FIG. 5 and, for brevity, their respective descriptions are not repeated in their entirety.

At block 512, rendered job data is transferred to the service printer in response to a determination that the service printer has enough space to store the job data. For example, the target printer may render the job, such as using a rasterizer on the target printer, while determining which service printer is to receive the job for remote storage and, in response to a determination that the printer has sufficient storage capability (e.g., using the storage status), the job data is sent to the service printer once the target printer completes the job render.

At block 514, job retrieval information is received by the target printer based on the transfer of the job data. The job retrieval information provided to the target printer may include user information, such as a username, and a hash identifier that is associated with the job data. For example, the hash identifier may be a unique identifier that represents the location of the stored job on the service printer.

At block 518, the job data is removed from the target printer in response to a confirmation of successful storage of the job at the service printer. For example, a remote job engine, such as remote job engine 108 of FIG. 1, may cause the job data stored in RAM of the target printer to be deleted when a storage confirmation message with the hash identifier is received from the service printer. In this manner, the local memory of the target printer is free to receive another job while the other job remains stored remotely at the service printer.

The job data is retrievable from the service printer using the job retrieval information, such as the hash identifier that may uniquely identify the copy of the job on the service printer. At block 520, the hash identifier associated with the desired job is sent to the service printer in response to a establishing a successful network connection with the service printer to retrieve the job. For example, a transfer engine, such as target transfer engine 306, may try to discover or otherwise establish a connection with the service printer and may return with a positive indication that the service printer is in an operational state or may receive a negative indication where the service printer is in an inoperable state. The target printer may identify multiple connection parameters of a connection method available to the service printer and use the connection parameters to form a connection between the service printer and the target printer to transfer job data. At block 522, the job data is transferred (e.g., retrieved) from the service printer using the hash identifier in response to a determination that the service printer is in an operational state and the hash identifier matches the store job information on the service printer.

At block 524, a command word may be sent to the service printer. The command word may be sent to instruct the service printer to perform an operation associated with the job. For example, a remote job engine, such as remote job engine 108 of FIG. 1, may send a command word after the job is retrieved by the target printer using the hash identifier, where the command word confirms to the service printer that the job may be removed or instruct the service printer to continue to store the job for further retrieval at a later time.

Figure 7:
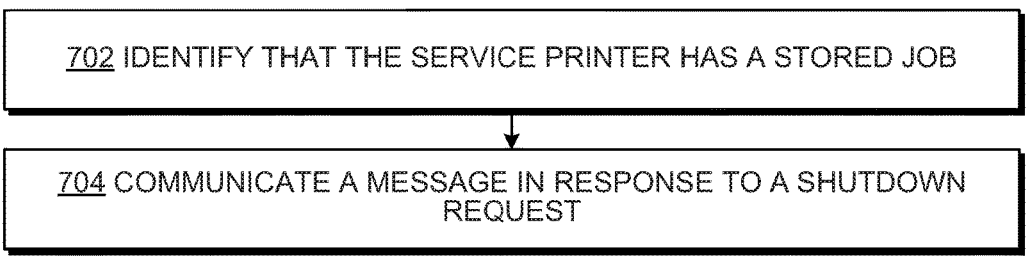
Figure 8:
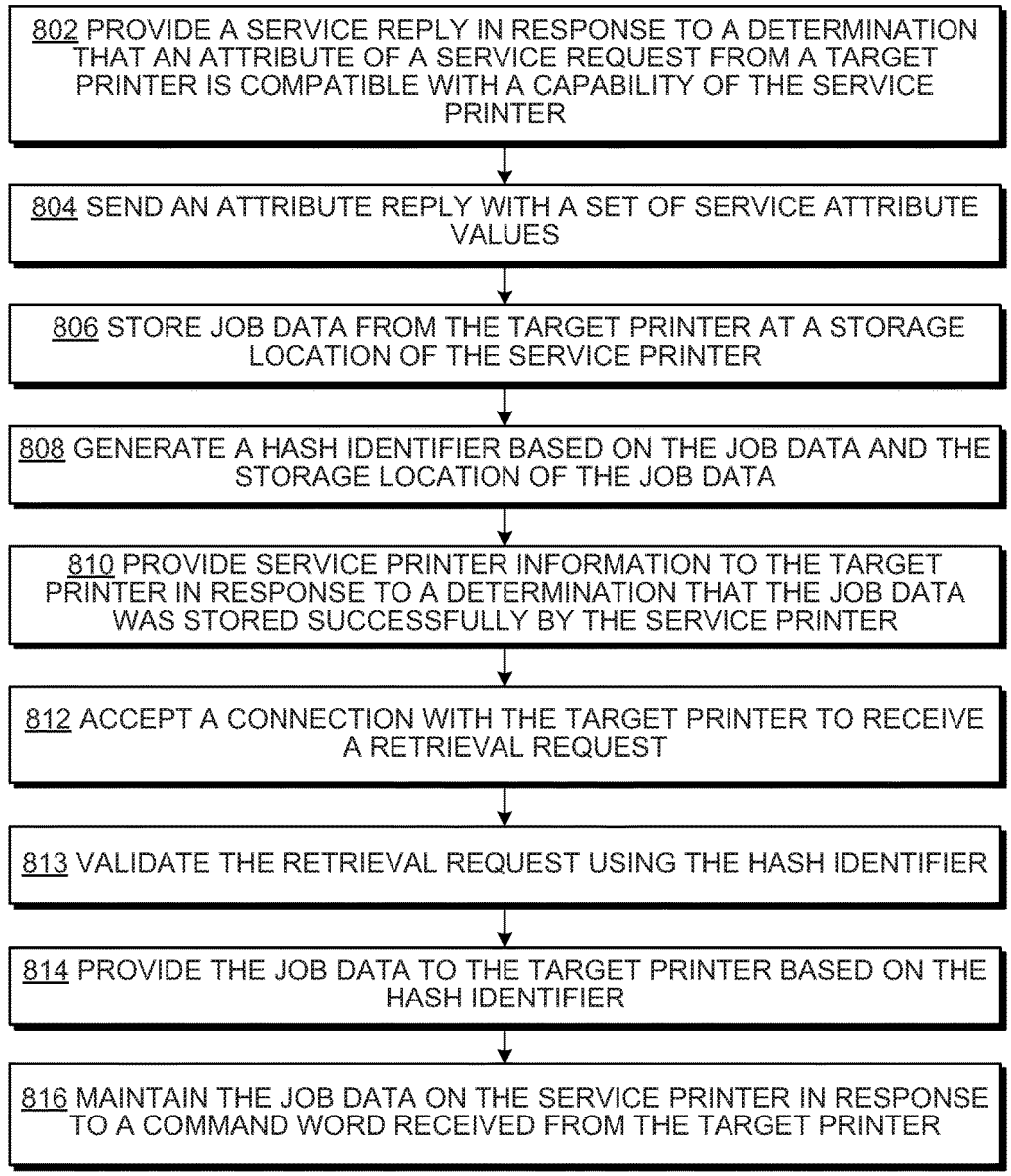

FIGS. 6-8 are flow diagrams depicting example processes of operation of a service printer. Referring to FIG. 6, processes of operation of a service printer may generally comprise providing a service reply, store job data from a target printer, generate a hash identifier based on the storage location, and provide the job data to the target printer in response to a request with the hash identifier. The operations of the service printer may be defined by executable instructions stored on a computer-readable storage medium of the service printer that cause operations described herein with respect to FIGS. 6-8 when the instructions are executed. The process of operation of a service printer may performable by the engines 312, 314, 316, and 318 of the service printer 338 of FIGS. 3A and 3B, for example.

At block 602, a service reply is provided in response to a service request from a target printer. For example, an attribute engine, such an attribute engine 312 of FIG. 3, may send a service reply in response to a determination that an attribute of a service request from a target printer is compatible with a capability of the service printer by comparing the job attributes of the request to the service attributes of the service printer and generating a service reply based on the comparison.

In response to the service reply, a target printer may send a storage request with job data included. At block 604, job data from the target printer is stored at a storage location of the service printer. The service printer may provide job retrieval information upon successful storage of the job. At block 606, a hash identifier is generated based on a storage location of the job data on the service printer. The hash identifier may be generated using multiple pieces of information such as the service printer identifier, the storage location on the service printer, and the job data itself. The generated hash identifier may be sent with other job retrieval information to the target printer from the service printer in response to a successful remote storage operation. The job data may be later retrieved using the provided job retrieval information. At block 608, the job data is provided to the target printer in response to a retrieval request made to the service printer using the hash identifier.

Referring to FIG. 7, processes of operation of a service printer may comprise communication that a job is stored on the service printer. At block 702, the service printer identifies that a job is stored on the printer that is being remotely stored on behalf of a target printer. For example, an identifier engine, such as identifier engine 318 of FIG. 3, may check a log of stored files to identify whether any remote jobs are stored and/or whether a particular remote job is stored. At block 704, a message is communicated in response to a shutdown request made to the service printer. For example, a message may be caused to be displayed on a control panel of the printer with information indicating a warning that a job is stored on the service printer and, if the service printer is shutdown, the remote job may not be available to the target printer upon request.

FIG. 8 includes blocks similar to blocks of FIG. 6 and provides additional blocks and details. In particular, FIG. 8 depicts additional blocks and details generally regarding communicating an attribute reply, providing service information to the target printer, accepting a connection with the target printer, and maintaining the remotely stored job. Blocks 802, 806, 808, and 814 are the similar to blocks 602, 604, 606, and 608 of FIG. 6 and, for brevity, their respective descriptions are not repeated in their entirety.

At block 804, an attribute reply with a set of service attribute values is sent to the target printer. For example, a reply message is sent to the target printer in response to a request for service attributes of the service printer. The target printer may find the service printer compatible with the service request and send the job data to be stored on the service printer. At block 810, service printer information is provided to the target printer in response to a determination that the job data was stored successfully by the service printer. For example, the service printer may identify a storage location for the job data, generate a hash identifier using the job data and a storage location of the print job on the service printer, and send the hash identifier to the target printer once the job data is stored on the service printer where the service printer information comprises the hash identifier.

A connection with the target printer is accepted at block 812, the retrieval request is validated at block 813, and the job data is transferred to the target printer based on the hash identifier received from the target printer at block 814. For example, a TCP connection is made between the service printer and a target printer, the target printer sends a retrieval request to the service printer, the service printer validates the retrieval request using the hash identifier, and the service printer transfers the job data identifiable by the hash identifier to the target printer. At block 816, job data is maintained on the service printer in response to a command word received from the target printer. For example, the job data is deleted from the service printer in response to a determination that the target printer sent a delete command word. For another example, the job data is stored on the service printer in response to a determination that the target printer sent a store command word. In this manner, the target printer may send job data to a remote service printer and maintain the job data remotely, which may be particularly useful when the target printer is, for example, limited on local memory resources available to store job data.

Although the flow diagrams of FIGS. 3A, 3B, and 4-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A print system comprising:
a processor; and
a memory resource storing machine readable instructions to cause the processor to:
broadcast a service request from a target printer in a network to a plurality of service printers using a network protocol;
receive response from the plurality of service printers in the network;
identify a service printer of the plurality of service printers based on the capability of the service printer to support the service request received from the target printer;
cause the job to transfer from the target printer to the service printer; and
maintain job retrieval information associated with the job, the job retrieval information to contain a service printer identifier associated with the service printer.

2. The system of claim 1, wherein the instructions stored in the memory resource cause the processor to retrieve the job from the service printer using the job retrieval information.

3. The system of claim 1, wherein the instructions stored in the memory resource cause the processor to identify a plurality of printers and select the service printer based on a storage status of the service printer and a size of the job.

4. The system of claim 3, wherein the instructions stored in the memory resource cause the processor to send a service attribute request to the service printer.

5. The system of claim 1, wherein:
the instructions stored in the memory resource cause the processor to:
receive a job identifier from the service printer, the job retrieval information comprising the job identifier and user information; and
retrieve the job from the service printer using the service printer identifier to identify a connection parameter of a connection method with the service printer and the job identifier to identify a storage location of the job.

6. A non-transitory computer-readable storage medium comprising a set of instructions executable by a processor resource on a target printer to cause the target printer to:
identify a set of attributes from a job request of a job;
broadcast a storage request to a plurality of print devices based on the set of attributes using a network protocol;
receive a response from the plurality of service printers in the network;
identify a service printer identifier from the response to the storage request;
identify a storage status of a service printer of the plurality of print devices;
establish a network connection between the target printer and the service printer to transfer the job to the service printer using the service printer identifier in response to a determination that the storage status is indicative that the service printer is available to store job data of the job and based on a capability of the service printer to support the service request received from the target printer; and
receive job retrieval information based on the transfer of the job data to the service printer.

7. The medium of claim 6, wherein the set of instructions is executable by the processor resource to:
render the job on the target printer, the job data comprising rendered data;

transfer the job data to the service printer in response to a determination that the service printer has enough space to store the job data; and transfer the job data to the target printer in response to a determination that the service printer is in an operational status and a hash identifier matches stored job information on the service printer.

8. The medium of claim 7, wherein the set of instructions is executable by the processor resource to:

receive the hash identifier from the service printer, the hash identifier associated with the job data;

store the job retrieval information on the target printer, the job retrieval information comprising the hash identifier and user information; and remove the job data from the target printer in response to a confirmation of successful storage of the job at the service printer.

9. The medium of claim 8, wherein the set of instructions is executable by the processor resource to:

send the hash identifier to the service printer in response to a successful network connection with the service printer; and retrieve the job data from the service printer using the hash identifier.

10. The medium of claim 9, wherein the set of instructions is executable by the processor resource to:

send a command word to the service printer to instruct the service printer to perform an operation associated with the job after the job is retrieved by the target printer using the hash identifier.

11. A non-transitory computer-readable storage medium comprising a set of instructions executable by a processor resource to:

broadcast a service request from a target printer in a network to a plurality of service printers using a network protocol;

identify a service printer of the plurality of service printers based on the capability of the service printer to support the service request received from the target printer;

provide a service reply in response to a determination that an attribute of a service request from a target printer is compatible with a capability of the service printer;

store job data from the target printer at a storage location of the service printer;

generate a hash identifier based on a storage location of the job data on the service printer; and provide the job data to the target printer in response to a retrieval request made to the service printer using the hash identifier.

12. The medium of claim 11, wherein the set of instructions is executable by the processor resource to:

send an attribute reply with a set of service attribute values; and generate the hash identifier using the job data and a storage location of the print job on the service printer.

13. The medium of claim 11, wherein the set of instructions is executable by the processor resource to:

provide service printer information to the target printer in response to a determination that the job data was stored successfully by the service printer;

accept a connection with the target printer to receive the retrieval request from the target printer; and validate the retrieval request using the hash identifier.

14. The medium of claim 11, wherein the set of instructions is executable by the processor resource to:

delete the job data from the service printer in response to a determination that the target printer sent a delete command word; and store the job data on the service printer in response to a determination that the target printer sent a store command word.

15. The medium of claim 11, wherein the set of instructions is executable by the processor resource to:

identify that the service printer has stored a job; and communicate a message in response to a shutdown request, the message comprising information that indicates that the job is stored on the service printer.

* * * * *